May 12, 1964     L. T. SLADEK     3,132,660
PNEUMATIC SPEED SENSING GOVERNOR
Filed Oct. 19, 1960
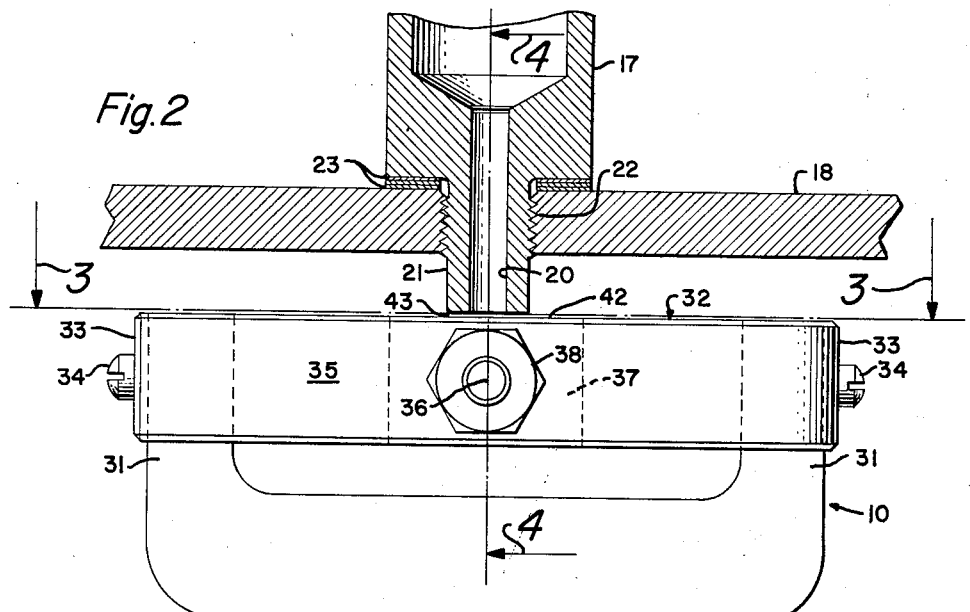
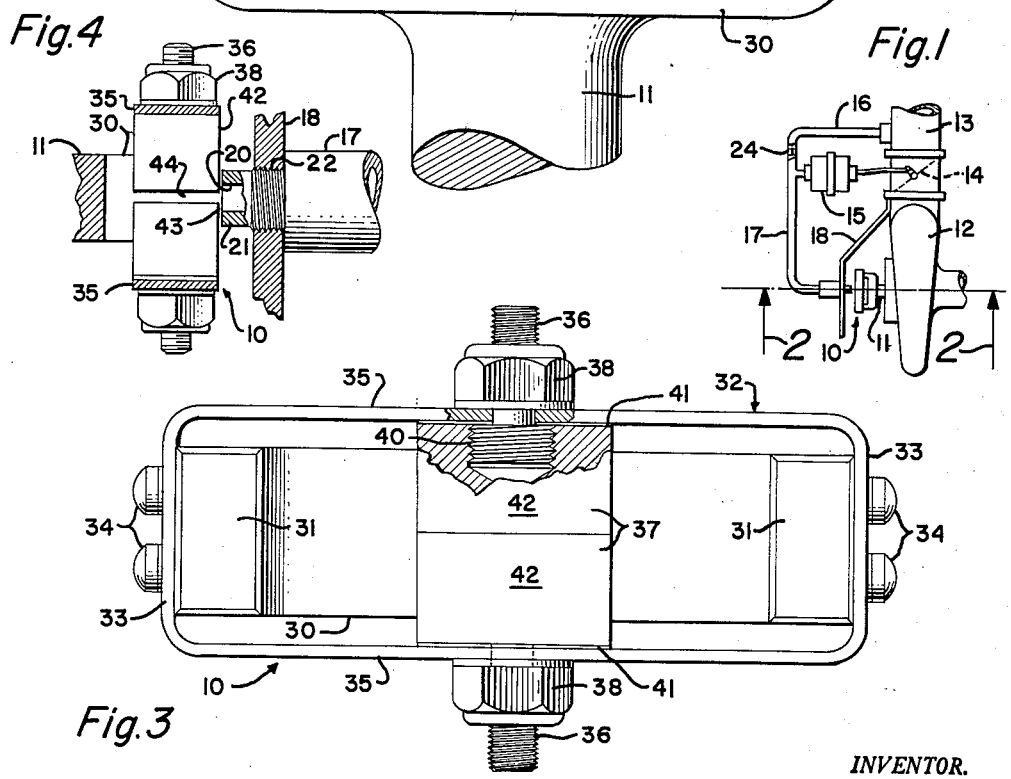
INVENTOR.
LEONARD T. SLADEK
BY
*Francis H. Beebe*
ATTORNEY

United States Patent Office 3,132,660
Patented May 12, 1964

3,132,660
PNEUMATIC SPEED SENSING GOVERNOR
Leonard T. Sladek, Torrance, Calif., assignor to The Garrett Corporation, Los Angeles, Calif., a corporation of California
Filed Oct. 19, 1960, Ser. No. 63,568
4 Claims. (Cl. 137—56)

This invention relates to governors or speed controlling mechanisms. It is more particularly directed to apparatus for pneumatically controlling the speed of operation of air motors, turbines and similar fluid pressure operated devices.

In the construction and operation of high-speed machinery, it has long been a problem to provide a simple, compact and dependable means for governing the operation of a prime mover, such as an air or gas turbine. The difficulties encountered in prior apparatus for this purpose have been largely overcome by the pneumatic speed sensing governor disclosed in copending application Serial No. 24,862, filed April 26, 1960, for reissue of Elmer D. Marlin Patent No. 2,896,653, now Re. 25,174, dated May 29, 1962. However, in the Marlin construction, the speed sensor acts to control pressure in a system including the hollow portion of a turbine or other shaft. Such speed sensor has been relatively satisfactory in operation, but because of the use of a hollow turbine shaft, special sealing devices that are expensive and difficult to maintain because of friction and vibration are also required.

It is an object of this invention to provide a speed controlling mechanism which is of simple, lightweight and compact design suitable for use with high-speed rotary motors, such as gas turbines, and which maintains proper control without the use of a hollow shaft and the attendant special sealing devices.

Another object is to provide such a speed controlling mechanism for a turbine engine, which mechanism functions in conjunction with an orifice formed in a stationary member to regulate the flow of fluid through the orifice without frictional contact with the stationary member and in response to the speed of the turbine.

Still another object of this invention is to provide such a speed controlling mechanism for a turbine engine which functions in conjunction with an orifice formed in a stationary member to restrict the flow through the orifice without frictional contact therewith and removes the restriction from the orifice when a predetermined speed of rotation is attained.

A further object of this invention is to provide a speed sensor for a high-speed rotary motor having a fluid pressure operated regulator, which includes an outlet to bleed pressure from the regulator and a rotating governor mechanism which is free from frictional contact with the outlet but nevertheless effectively closes it during normal motor speeds and allows it to open when a predetermined speed is exceeded.

The above and other objects of the invention will be apparent from the following description and the accompanying drawing, in which:

FIG. 1 is a schematic view showing an air turbine provided with a speed controlling mechanism embodying the features of this invention;

FIG. 2 is an elevational view, partly in section, of the speed controlling mechanism shown in FIG. 1, the view being taken along the line 2—2 of FIG. 1;

FIG. 3 is an elevational view in the plane of the horizontal line 3—3 of FIG. 2; and FIG. 4 is a sectional view taken along the line 4—4 of FIG. 2 and rotated 90 degrees, showing the parts in actuated positions.

Referring now to the drawing, and particularly FIG. 1, a speed controlling mechanism 10 is shown mounted on an extension 11 of the shaft of a pneumatic turbine 12. This turbine has an inlet conduit 13 for conducting gas or other fluid under pressure from a suitable source to the turbine wheel under the control of a conventional valve 14 provided in the conduit 13. Valve 14 is arranged for pivotal movement between open and closed positions in response to a suitable actuator, such as a pneumatic actuator 15. Fluid pressure may be transmitted to the actuator 15 from the inlet conduit 13, at a point upstream of the valve 14, through a conduit 16. The construction is such that, as long as pressure is applied to the actuator, the control valve 14 will be maintained in open position. However, by bleeding fluid at predetermined rates from the actuator 15, the valve 14 may be controlled so as to regulate the amount of fluid passing to the turbine 12.

Speed control mechanism 10 controls the rate of fluid bleeding from the actuator in accordance with the principles of this invention. For this purpose, a fluid conduit 17, held in proper operative position by a support 18, connects the pressure chamber of the actuator 15 with an outlet orifice 20. The orifice 20 is shown on an enlarged scale in FIG. 2 as a restricted outlet in a reduced portion 21 formed at the end of tube 17 and securely held on the support 18 in any conventional manner, such as by welding or by screw threads 22. Shims 23 may be provided to adjust the position of the end of the reduced portion 21 and orifice 20 with respect to the support 18 and the moving parts of the speed control device 10. To control the flow of fluid through the orifice 20, the end face of the reduced portion 21 is positioned in close proximity to the speed controlling mechanism 10. Such controlled fluid flow, in cooperation with a restricted orifice 24 (FIG. 1) in the conduit 16 upstream of the actuator 15, controls said actuator, as will be explained more fully below.

As mentioned above, the speed controlling mechanism 10 is mounted on an extension 11 of the turbine shaft so that it will rotate therewith and sense the speed thereof. Thus, shaft 11 is provided at its end with a yoke or support 30 having spaced arms 31 for supporting a rectangular spring frame 32. This frame is constructed of suitable resilient material, such as spring steel, and is formed with end portions 33, which are secured to the spaced arms 31 of the support by screws 34, and side pieces 35. As indicated, rectangular frame 32 and the supporting yoke are arranged to rotate in a plane that is perpendicular to the axis of rotation of the shaft 11. Each of the side pieces 35 has an opening for the reception of a screw 36 attached to and projecting from a combination flyweight and orifice closing or restricting member 37, which is secured in proper operative position to the associated side piece 35 with a cooperating nut 38. The flyweights are shown as substantially equally sized rectangular blocks of metal which are of such depth as to fill the space between the side pieces 35. Either by providing differential threads 40 on the screws 36, or through the use of shims 41, or both, the loading of the resilient members 35 may be adjusted. The flyweights 37 are also constructed and positioned so that the outer side faces 42 thereof, which may be machined smooth if desired, are in close proximity to the end of the reduced portion 21 and the orifice 20. Thus, said flyweights restrict or substantially close the orifice 20, but allow a predetermined reduced flow therethrough. Even though the orifice is substantially closed, a small space 43 is provided between the machined faces 42 of the flyweights and the end face of the reduced orifice portion 21 of the conduit 17. Consequently, as the speed controlling device 10 rotates with the shaft 11, there will be no frictional contact of the parts, particularly the flyweights 37 and the smooth faces 42 thereof with the reduced end 21 of the orifice pipe.

As the speed of rotation of the shaft 11 increases up to turbine speeds of from 40,000 to 60,000 r.p.m., the flyweights 37 tend to separate due to flexure of the resilient side pieces 35 caused by centrifugal force. The physical characteristics of the entire construction, and particularly the side pieces 35, the preloading of said side pieces, and the size and weight of the flyweights 37, are such that as the centrifugal force increases with the speed of rotation of the shaft, at some predetermined speed the weights 40 will separate to an extent as shown in FIG. 4. Such separation forms a space or passage 44 in direct alignment with the outlet orifice 20 so as to allow substantially unrestricted flow of fluid through said orifice. The orifice 20 is larger than the restriction 24 in the supply conduit, so that the escape of fluid through said orifice 20 will reduce the pressure in the actuator 15 and cause the valve 14 to close, thereby reducing the fluid flow to the turbine.

From the foregoing description, it will be apparent that by means of the speed sensor 10, it is possible to regulate the flow of fluid through the orifice 20 in response to the speed of the turbine. Furthermore, such regulation takes place free of any frictional contact between the rotating turbine shaft and the fluid pressure conduits, thereby eliminating the usual rotary fluid seals. It will also be understood that, depending upon the physical characteristics and design of the spring members 35 and the flyweights 37, fluid flow through the orifice 20 could be regulated in accordance with the principles of this invention with a single spring and flyweight attached to the yoke 30 for rotation in a plane perpendicular to the turbine shaft. Moreover, depending upon the design of the pneumatic regulating system for the turbine, the movement of the flyweights due to centrifugal force may be arranged to close rather than open a fluid orifice, and the resulting changes in fluid pressure may be used to perform functions other than and in addition to the control of fluid flow to a turbine. Various other changes may be made in the construction and certain features may be employed without others without departing from the invention or sacrificing any of its advantages.

I claim:

1. In a device having a rotatable member and a pneumatic regulator with a stationary orifice for bleeding fluid from said regulator, a governor comprising: a support formed for operative engagement with the rotatable member and rotation therewith in a plane perpendicular to the axis of rotation thereof; a pair of equally weighted and equally biased spring members mounted on and parallel to said support, said spring members being adapted to move away from one another in response to centrifugal force when said rotatable member reaches a predetermined speed of rotation; and means carried by and forming part of the weighted portion of said spring members, said means comprising a pair of flow-blocking elements mounted on said spring members for movement therewith in spaced relation from any other structure, said flow-blocking elements engaging one another on a plane in axial registration with said stationary orifice, the spacing of said flow-blocking elements from said stationary orifice being limited to permit predetermined restricted fluid flow therefrom, the response of said spring members to centrifugal force serving to separate said flow-blocking elements and thus permit an increased flow from said orifice.

2. In combination with stationary means providing an outlet orifice in a plane surface for a pressure regulator, a governor comprising: a support formed for operative engagement with a rotating member for rotary movement therewith in a plane perpendicular thereto; first resilient means attached to said support and having a weight member secured thereto; and second resilient means attached to said support in parallel relation with said first resilient means and having a weight member secured thereto in contact with the weight member of said first resilient means, said first and second resilient means displacing said weighted members equally in response to equal forces, said weight members being free from engagement with any other elements and being dynamically balanced, one face of each of said weight members being positioned in a common plane parallel to and in close proximity to the plane surface containing said orifice so as to reduce the flow of fluid therethrough, centrifugal force tending to flex equally said first and second resilient means and separate said weight members, thereby providing a passage adjacent said orifice to increase the flow of fluid therethrough.

3. In combination with means forming an outlet orifice in a plane surface for a pressure regulator, a speed sensor comprising: a support having spaced arms formed for operative engagement with a rotating shaft for rotary movement therewith in a plane perpendicular thereto; centrifugally operable spring means forming a substantially rectangular frame attached to said spaced arms; and a pair of substantially identical block members attached to opposite sides of said rectangular frame in contiguous relation to one another, said opposite sides of said frame imposing substantially equal spring bias on said members, one side of each of said members forming a continuous plane surface disposed in close proximity and parallel to the plane surface of said orifice forming means so as to restrict fluid flow therethrough, another side of each of said members forming a continuous plane surface normal to said orifice plane surface, centrifugal force causing said members to move and break said one side plane surface and provide a passage between said second-mentioned sides opposite said orifice, thereby increasing fluid flow through said orifice.

4. In combination with stationary means forming an outlet orifice in a plane surface for a fluid pressure responsive bleedoff type actuator, a governor comprising: support means formed for operative connection with a rotatable member to be driven thereby, said support means providing arms on opposite sides of the axis of rotation of said support means and said outlet orifice; a plurality of strip-type equally biasing spring sections each being secured at at least one end to a selected arm for rotation in a plane normal to the axis of rotation of said support means and parallel to the plane surface containing said outlet orifice; and a weight member carried by each of said spring sections, said weight members being of equal weight and engaging one another on a line in axial registration with said outlet orifice in spaced relation from any other element, each of said weight members having a flat surface in a common plane spaced from the plane surface of said orifice-forming means a predetermined limited distance to restrict fluid flow through the orifice, movement of said weight members in response to centrifugal force serving to flex said spring sections and separate said weight members to permit increased fluid flow from said orifice.

References Cited in the file of this patent

UNITED STATES PATENTS

| | | |
|---|---|---|
| 162,219 | Chase | Apr. 20, 1875 |
| 1,347,208 | Cockburn | July 20, 1920 |
| 2,779,582 | Hopper | Jan. 29, 1957 |
| 2,858,839 | Jackson | Nov. 4, 1958 |
| 2,896,653 | Marlin | July 28, 1959 |

FOREIGN PATENTS

| | | |
|---|---|---|
| 195,150 | Great Britain | Mar. 22, 1923 |
| 909,655 | Germany | Apr. 22, 1954 |
| 921,850 | Germany | Dec. 30, 1954 |